Dec. 30, 1930.  J. F. LAWSON  1,786,759
ELECTRIC WELDING
Filed June 24, 1927
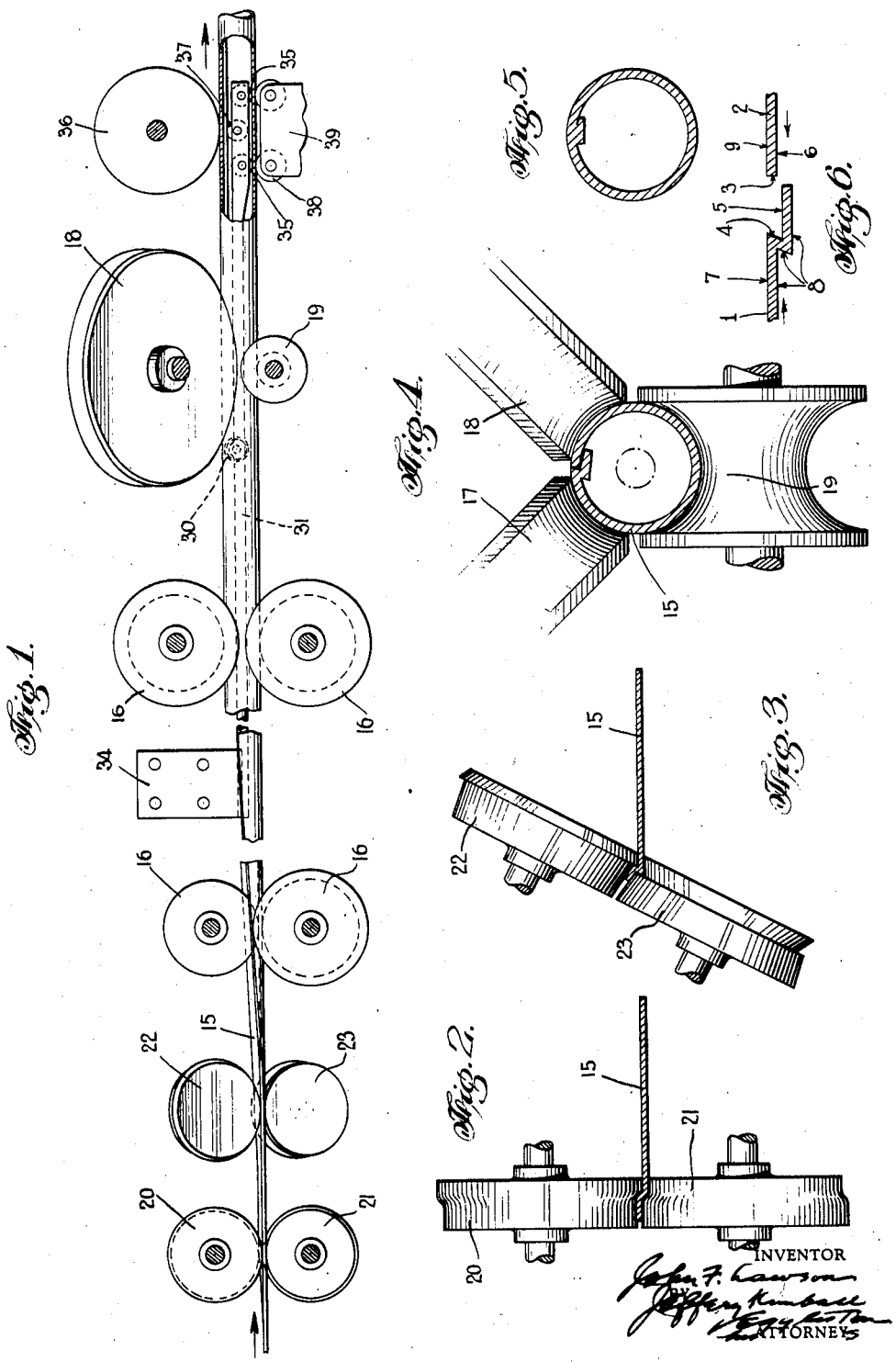

Patented Dec. 30, 1930

1,786,759

UNITED STATES PATENT OFFICE

JOHN F. LAWSON, OF BROOKLYN, NEW YORK

ELECTRIC WELDING

Application filed June 24, 1927. Serial No. 201,047.

My invention relates to welding, and more particularly to autogenous electric welding of long seams. It contemplates a new form of autogenous welding that is peculiarly adapted for the manufacture of tubing; it may be used also for other purposes however.

In electric line lap welding as heretofore ordinarily practiced, the pieces of metals of the two sides of the seam are laid over each other, i. e. "lapped" one on the other so the resulting thickness in the lapped portion is equal to the sum of the thicknesses of the two lapped parts. The weld is made between the contacting lapped broad surfaces of such pieces of metals. Electrodes are disposed on opposite sides of the metal and are pressed toward each other and against the lapped parts to press their lapped, broad surfaces together, while current passes from one electrode to the other through the lapped metal. The combined pressure of the electrodes and heat caused by the flow of current produces the weld. The narrow edge surfaces of the lapped pieces (which are equal in width to the thickness of the metal) take no part in the operation.

As distinguished from electric line lap welding, autogenous line butt welding is accomplished by bringing opposed surfaces of the metals into contact with each other and applying electrodes to the same surface of the metal parts so the electrode pressures are not opposed to each other. The electrodes thus exert substantially only contacting pressure upon the metal to facilitate the flow of current, the welding pressure being applied at some distance away from the point of heating which is located between the electrodes. In electric line butt welding as heretofore practiced, the area of contact between the surfaces to be welded has not exceeded the thickness of the metals.

In electric line lap welding, however, as heretofore practiced, a break running parallel to the line of the weld occurs in the finished surface. Ordinarily, there is an abrupt change in level occurring at the boundaries of the two overlying pieces; that is to say, the top surface of the finished article is abruptly stepped down from the exposed broad top surface of the upper piece of metal to the exposed broad top surface of the lower piece of metal and the bottom surface of the finished article is abruptly stepped up from the exposed broad bottom surface of the lower piece to the exposed broad bottom surface of the upper piece of metal. The height of this step can be reduced in various ways. For example, it can be reduced somewhat by heating the metal between the electrodes until it is so soft that it will be rolled or pressed by the pressure of the electrodes to be thinner than the original thickness of the lapped portion. Also it has been proposed to substantially eliminate the step by forming an L shaped trough in the marginal portion of the metal at one side of the seam, and laying the marginal portion of the opposite metal in this trough so the exposed top surfaces of the two metals, after the seam has been lap welded will lie at about the same level; the welding is done as before, however, i. e., between the contacting broad surfaces of the metals lying between and pressed together with the opposed electrodes. While this latter procedure may substantially eliminate the step or abrupt change of level of the top surface (or in the case of a tube, the outer surface) it leaves a more or less open crevice that is not entirely satisfactory where the product is to be painted or treated in certain other manners.

According to my invention, I eliminate both the step and the crevice in the top or outer surface by autogenously welding the piece or metal of one side of the seam, to more or less of the edge surface of the undistorted piece or metal at the opposite side of the seam. For additional strength, or otherwise, I may also autogenously weld more or less of the broad surfaces of the opposite metals where one lies on top of or underneath the other. Where elimination of the crevice is of prime importance, I especially take care to weld fast together the broad metal surface on one side of the same and that portion of the edge surface of the opposite piece which is adjacent the exposed surface of the finished article, so as to entirely close the crevice at the exposed surface of the finished product, regardless of whether the remainder of the edge surface is welded to the broad surface opposed thereto or not. Such a weld as I propose can be made on those machines which are now used for making butt-welded tubing, as hereinafter explained; it can be made on other machines also, as will be apparent. Certain common faults of autogenous butt-welding machines, as ordinarily used for butt-welding, are eliminated by my invention; the weld can be obtained more readily at exactly the desired place, the weld can be made more complete lengthwise of the junction than is sometimes the case with butt-welding, and the "sawdust" or finely divided metal, which ordinarily is thrown down inside a butt-welded tube, is eliminated; this sawdust wears any tools that may be used inside the tube. Such bending of the metal as may be employed in the use of my invention, can be done at the welding machine just prior to the welding if desired, and as a part of a continuous operation resulting in the uniting of the seam.

While hereinbefore I have referred principally in terms to the welding of separate pieces or metals, it will be understood that the description includes the welding of the opposite margins of a single piece, for example the welding of the opposite edges of skelp folded up and welded at the seam to form pipes and tubes. My invention is applicable both to the welding of separate pieces and the welding of opposite margins of the same piece.

The accompanying drawings illustrate my invention as applied to the manufacture of tubes or pipes on a well known form of electric butt-welder, and in the following description of its operation, I have pointed out some additional subsidiary features of my invention. Fig. 1 diagrammatically illustrates the rolls of the butt-welder in elevation, certain rolls which can be used with my present invention being added thereto. Figs. 2 and 3 are larger views of the added rolls. Fig. 4 is a sectional view adjacent the electrodes and pressure roll of the welding machine, the figure also showing the relation of the marginal portions of the opposite metals at the seam and the relation of the electrodes and pressure roll. Fig. 5 is an illustrative section of a tube made according to my invention. Fig. 6 is used in defining certain terms which I employ in this description.

Referring first to Fig. 6: 1 and 2 are sections of two separate pieces of sheet metal or they may be opposite marginal portions of a single piece of metal, as, for example, the opposite margins of skelp folded up to be welded into pipe or the like. The edge of metal 1 is so depressed, it may be by bending, that when the two pieces are moved toward each other in the directions indicated by the arrows, the narrow surface 3 of the metal 2 will strike against the shoulder 4, and the surface 5 will lie against the surface 6. To identify the various surfaces in these specifications: I call such surfaces as 3 "edge surfaces". The larger surfaces 6, 7, 8 and 9 are the "broad surfaces" of the metals. Where the shoulder 4 is formed by bending, both 4 and 5 are parts of the initial "broad surface" 7; hence, (regardless of the manner in which the shoulder is formed) they are properly parts of the "broad surface" 7 of the piece or margin 1. Surfaces 7 (excepting parts 4 and 5) and 9 will form parts of one (usually the "exposed" or more prominent, top or outside) surface of the finished article, and hence are called "corresponding" broad surfaces; likewise 8 and the major part of 6 ultimately form a surface of the finished product and hence are also "corresponding" broad surfaces. "Depressing", e. g. to form the shoulder 4, does not refer to direction, i. e. downward exclusively nor does it refer alone to the method, e. g. by bending, but rather to the form, offset, and the like, which is necessary except as the contrary may appear.

In Fig. 1, the skelp 15 or metal strip from which the tube is formed, passes through the machine in the direction of the arrows of Fig. 1. The usual forming rolls to fold the skelp into tube form as the skelp passes between them are indicated at 16; a suitable number will be employed. Electrode rollers of well known form are shown at 17 and 18, and the co-operating pressure roll is shown at 19, the latter supporting the tube underneath. In order to weld one margin of the broad surface of the skelp across the edge surface of the other margin, in accordance with my invention, the first mentioned margin is here depressed or deformed to form the shoulder 4 as indicated with respect to the metal at 1 in Fig. 6. While this is not necessarily done at the welding machine, I have found that it can be done at the welding machine, and more particularly just in advance of the forming rolls 16. I have added suitable rolls to the machine for this purpose and thus the operation of making tubing from flat skelp by my invention is a continuous one as before. Preferably (in order not to shear or break the metal) bending to the form of Fig. 6 is accomplished by a plurality of operations, rather than one, the first operation leaving the corner or corners of the bend more or less curvilinear and the succeeding operation or operations bringing the corner or corners more nearly to that angular form which is advantageous. To this end, the flat skelp in Fig. 1 first enters a pair of rolls 20 and 21 faced at their edges and co-operating with each other and one marginal portion of the skelp as shown in Fig. 2. These bring the margin partly to its final form as appears in Fig. 2. After leaving the rolls 20 and 21, the same margin of the skelp passes between the co-operating rolls 22 and 23 which bend the metal still further, ordinarily to its final form, and change the corners into almost angular forms, as is shown in Fig. 3. In order that the shoulder (4 in Fig. 6) may lie in radii of the tube or, preferably, be somewhat overshot as shown in Fig. 6 (for purposes later explained) the rolls 22 and 23 are placed somewhat at an angle to the perpendicular as shown in Fig. 3. From the rolls 22 and 23, the skelp passes to the forming rolls 16 as before, and there is folded into tube form in the ordinary manner; in so far as may be necessary, some or all of the forming rolls 16 can be refaced to accommodate the depression in the edge of the skelp margin. From the forming rolls the skelp passes to the welding station precisely as in the prior line butt welding.

From Fig. 4 it will be observed that the folding of the skelp 15 into tube form presents the edge surface (3 in Fig. 6) of the metal at the righthand side of the seam, to the part or shoulder (4 in Fig. 6) of the broad surface 7 of the metal at the opposite side of the seam. As the seam passes between them, the electrodes 17 and 18 and pressure roll 19 co-operate to press this edge surface against the shoulder and autogenously weld them together, thus welding of the broad surface 7 across the edge surface 3 of the opposite side of the seam. The subsurface 5 may act to guide the margin at 3 toward the shoulder. Ordinarily the height of the shoulder 4 will substantially equal the thickness of the metal at the opposite side of the seam so that the corresponding broad surfaces 7 and 9 will lie at about the same level, thus making a substantially smooth unbroken exposed surface 7—9 on the finished article. From the electrodes the progressively welded seam passes to the seam-compressing device 36, 37 which compresses the seam, rolling down any burr that may have been extruded, equalizing any slight difference there may be between the levels of the broad surfaces 7 and 9, and preferably pressing the part-surface 5 tight up against the broad surface 6. The seam-compressing device shown is of a well known form consisting of an outside roller 36 pressing directly on the seam, and an inside roller 37 also bearing directly on the seam; the latter is carried at the end of a bar 31 and is supported against the thrust of 36 by the inside rollers 35 in co-operation with the opposed outside rollers 38 which are carried by a suitable bracket 39. The bar 31 is held by a bracket 34 fastened to a fixed part of the machine and holds the rollers 35 and 37 in place as the tube is drawn over them.

It is preferable that the metals be quite hot when 5 is pressed against 6. For this reason it is preferable that 5 be heated as well as 3 and 4, and that the seam-compressing device be located on the welding machine as indicated, so as to take advantage of the heat remaining in the metal when it arrives at the seam-compressing device. As before mentioned, the marginal portion or surface 5 may act to guide the edge surface 3 to the shoulder 4; that is to say, the right hand metal may pass in contact with surface 5 as the edge surface and shoulder are moved toward each other. Preferably the arrangement is such as to assure this contact. This may be accomplished by suitably placing 5 and adjusting the parts of the machine. Furthermore, the seam-centering device at 30 may assist to the same end. Some such device is customarily used to keep the seam midway between the electrodes 17 and 18. This may be a small roller, for example, arranged not only to keep the seam midway between the electrodes 17 and 18 but also to lift one or both the metals at the sides of the seam slightly, and thus cause contact between 5 and the right hand metal as the metals approach the electrodes and the latter cause 3 and 4 to contact with each other. The roller 30 may be supported, for example, on the bar 31, with or without a supporting roller immediately below it. By thus sliding the right hand metal in contact with more or less of the portion 5 of the broad surface 7 close to the electrodes 17 and 18, more or less current is permitted to flow between the right hand metal and the portion 5 of the broad surface. This serves to a certain extent to heat the metal of the part-surface 5. Independently of this however, the metal at 5 is heated by heat flowing from the actual welding of the edge surface 3 against the shoulder 4. Preferably therefore I apply the pressure of the seam compressing device to press the part-surface 5 of the left hand metal against the broad surface 6 of the right hand metal, while these metals are still hot from this heat. That is to say, I preferably seat 5 against 6 immediately after the welding is done at 3—4, as by a compressing mechanism (e. g. 36—37) on the welding machine and rather close to the welding electrodes 17 and 18 so that the heated metal reaches this mechanism before the metal has cooled. As the tube leaves the machine therefore, the surface 5 is ordinarily more or less welded to the surface 6 so that in section the welded tube looks something as illustrated in Fig. 5 (compare this with the unwelded skelp illustrated in Fig. 4).

In order to restrain such tendency as there may be for the right hand metal to slip over the shoulder 4 under the pressure of the rollers at the welding throat, the shoulder 4 may be overshot as it were (see Fig. 6), so that the upper edge of the shoulder 4 strikes first the upper portion of the edge surface 3. That is to say, the marginal metal is so far depressed or deformed that the surface 4 is so inclined that it first contacts with the outer side of edge surface 3. Figs. 4 and 6 show the left-hand metal depressed to this extent. Depressing the metal to this extent also serves the further purpose of assuring welding immediately adjacent the surface 7—9 of the product, thus assuring the elimination of the crevice before mentioned, even though the pressure exerted at 17, 18 and 19 is too little to weld the whole of the edge surface 3 to the whole of the shoulder 4. For some purposes it may not be necessary to completely weld the whole of this edge surface to the whole of the shoulder, but welding along a narrow line immediately adjacent 7 and 9 may be sufficient.

It will be observed that my invention is not limited to the details illustrated and described above, except as appears in the following claims.

I claim:

1. The method of electric welding which consists in depressing the metal at one side of the seam so as to lap a broad surface of said metal across the edge surface of the metal at the opposite side of the seam pressing said edge surface to said board surface, and passing current between said two surfaces, thereby welding said edge surface of the undepressed metal to said board surface opposed to it.

2. The subject matter of claim 1 characterized by the fact that the metal at the first mentioned side of the seam is so far depressed that its broad surface, when presented to the edge surface of the metal at the opposite side of the seam, strikes only or first that portion of said edge surface which is adjacent that broad surface of the second mentioned metal which corresponds to the said broad surface of the first mentioned metal.

3. The method of electric welding which consists in welding a broad surface of the metal at one side of the seam across the edge surface of undepressed metal at the opposite side of the seam by pressing said metals together at the seam and passing current between them, and pressing the first mentioned metal against the second mentioned metal beyond the seam.

4. The method of electric welding which consists in welding a broad surface of the metal at one side of the seam across the edge surface of undepressed metal at the opposite side of the seam by pressing said metals together at the seam and passing current between them and, beyond said weld, as measured transversely of the metal, welding a broad surface of the first mentioned metal to a broad surface of the second mentioned metal.

5. The method of electric welding which consists in depressing by a plurality of operations, the metal which is to form one side of the seam, the first depressing operation forming a curvilinear corner in the depressed broad surface of said metal and the succeeding operation or operations bringing said corner to more nearly an angular form, and thereafter welding the edge surface of undepressed metal at the opposite side of the seam against the said depressed broad surface by pressure and passing current between them.

6. The subject matter of claim 5, characterized by the fact that the depressing operations arrange a portion of the first mentioned metal to extend across a broad surface of the undepressed metal.

7. The subject matter of claim 5, characterized by the fact that the depressing operations bend the first mentioned metal so far that the said depressed broad surface, when presented to said edge surface, strikes only or first that portion of said edge surface which is adjacent that broad surface of the undepressed metal which corresponds to the broad surface to which said edge surface is welded.

8. The method of electric welding which consists in depressing the metal which is to form one side of the seam so as to oppose a broad surface of said metal to the edge surface of the metal of the opposite side of the seam, and then pressing said edge surface and said broad surface into contact and applying current to the corresponding broad surfaces of said metals to cause welding current to flow between said edge surface and the opposed broad surface.

9. The method of electric welding which consists in deforming the metal which is to form one side of the seam so as to oppose a broad surface of said metal to the edge surface of undeformed metal of the opposite side of the seam and also to provide a portion of the first mentioned metal to extend across a broad surface of the said undeformed metal, then, while passing current between the metals, moving one or both said metals to pass the undeformed metal and said portion of the other metal over and in contact with each other to bring the edge surface of the undeformed metal into contact with the deformed broad surface of said other metal, and exerting welding pressure to press said edge surface and deformed broad surface together.

10. The method of claim 9 applied to the manufacture of a tube, characterized by the facts that the said deforming is done immediately in advance of the folding of the skelp into tube form, and that the current is provided by electrodes engaging the outer surface of the tube and said welding pressure is exerted by said electrodes in conjunction with a support engaging the opposite side of the tube.

11. The method of claim 9, applied to the manufacture of a tube, characterized by the fact that the said deforming is done immediately in advance of the folding of the skelp into tube form, that the current is provided by electrodes engaging the outer surface of the tube and said welding pressure is exerted by said electrodes in conjunction with a support engaging the opposite side of the tube, and that the mentioned portion of the deformed metal is pressed tight against the metal of the opposite side of the seam while hot from the welding current.

12. The method of welding which consists in depressing the metal at one side of the seam so as to lap a broad surface of said metal across the edge surface of the metal at the opposite side of the seam, and passing an electric current between said metals to weld said edge surface of the undepressed metal to said broad surface opposed to it.

13. The method of welding which consists in lapping the metal at one side of the seam across the edge surface of undepressed metal at the opposite side of the seam pressing the metals together at the lap, and there passing current between the metals to weld them, and pressing the first mentioned metal against the second mentioned metal beyond the seam.

14. The method of producing a long metallic joint which consists in providing the metal at one side of the juncture with a shoulder extending substantially parallel with the adjacent edge of the said metal, pressing an edge surface of the metal at the opposite side of the juncture against said shoulder throughout a relatively short length of the seam, passing an electric current across the juncture of the metals, the flow of current being substantially localized at about the length of seam where the pressure is exerted, and progressively passing the seam through the zone of pressure and current, the pressure and current being correlated to weld the said edge surface to said shoulder.

15. The method of producing welded tubing which consists in providing skelp with a shoulder displaced from and extending substantially parallel with one edge of the skelp, passing said skelp longitudinally between electrodes bearing on the skelp at opposite sides of the seam and between which current flows across the seam in a relatively localized zone, and pressing said shoulder against the edge surface of the skelp at the opposite side of the seam about at the zone of current flow, the current and pressure being so correlated that the said edge surface is welded to said shoulder thereby.

16. The method of producing welded tubing which consists in bending one edge portion of the skelp to produce a shoulder about equal in height to the thickness of the skelp and a strip between said shoulder and the adjacent edge of the skelp lying in a plane about parallel with the original broad surface, passing said skelp longitudinally between electrodes bearing on the skelp at opposite sides of the seam and between which current flows across the seam in a relatively localized zone, bringing the opposite edge portions of the skelp into juxtaposition with said shoulder engaging the opposite edge surface of the skelp and said strip close to a broad surface at the opposite side of the seam, and pressing said edge surface and shoulder together about at the zone of current, the current and pressure being correlated to weld said edge surface and shoulder.

In testimony whereof, I have signed this specification.

JOHN F. LAWSON.